Aug. 30, 1927.
I. NIEMI
SCRAPER
Filed July 16, 1926
1,641,007
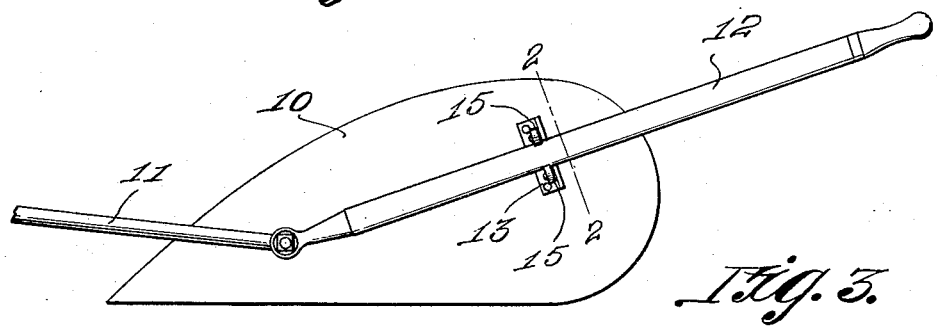
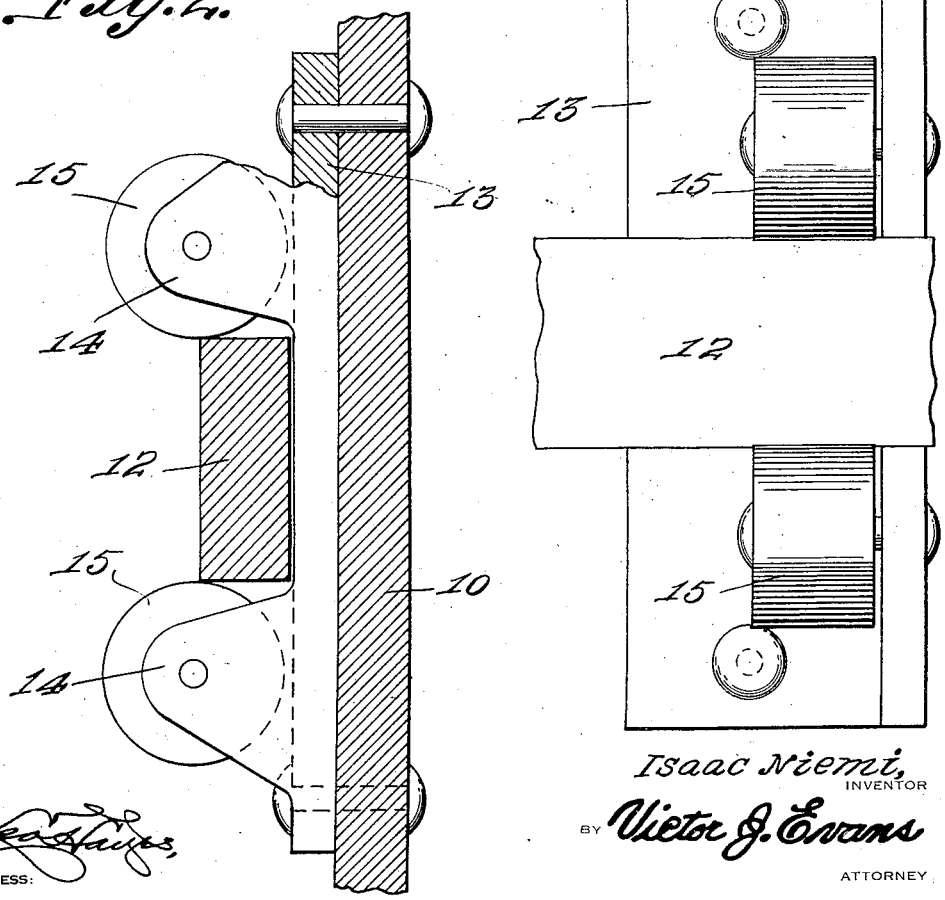
Isaac Niemi,
INVENTOR Patented Aug. 30, 1927.

1,641,007

UNITED STATES PATENT OFFICE.

ISAAC NIEMI, OF MINNEAPOLIS, MINNESOTA.

SCRAPER.

Application filed July 16, 1926. Serial No. 122,938.

This invention relates to scrapers and especially to that form of scraper utilized in the leveling of top soil and which embodies among other characteristics the pivotally mounted handle members to facilitate guiding of the scraper while in use, and to permit the scraper in its entirety to discharge its contents independently of the handle members, thereby relieving the operator from manually lifting and reversing the position of the scraper.

An object of the invention contemplates the use of roller members carried by the scraper and between which the handle members are received in the instance of locking the latter upon the scraper.

With the above and other objects in view, the invention further includes the following novel features and details of construction to be hereinafter more fully described, illustrated in the accompanying drawing and pointed out in the appended claim.

In the drawing:

Figure 1 is a side elevation of the invention;

Figure 2 is a sectional view taken on the line 2—2 of Figure 1;

Figure 3 is an enlarged elevation of the roller members engaging a fragmentary portion of the handle member.

Referring to the drawing in detail, wherein like characters of reference denote corresponding parts, the reference character 10 indicates the usual and conventional form of road scraper having the ends 11 of an attaching yoke (not shown) pivotally mounted upon its forward end. A pair of companion members 12 have their forward ends correspondingly mounted at the junctures of the end portions 11 of the yoke (not shown).

Positioned at desired heights upon the opposite sides of the scraper are elongated plates 13. Spaced apertured ears 14 are bent outwardly upon one side edge of the plate and have journalled thereon roller members 15. The handle members 12, in their normal positions, are held between the roller members 15.

In the use and operation of the present invention it is manifest that an operator upon grasping the handle members 12 may direct and exercise an inward tension upon said handle members to retain the latter between the roller members 15 to facilitate the guiding and pitch of the scraper. When the scraper 10 becomes filled, the operator then spreads the handle members 12 apart sufficiently, in order that the forward edge of the scraper will dig into the soil, which upon subsequent movement will dump the contents thereof thereby relieving the operator from bodily reversing the scraper. The handle members are free and held by the operator and subsequently positioned between the roller members 15 and in position for use.

The invention is susceptible of various changes in its form, proportions and minor details of construction and the right is herein reserved to make such changes as properly fall within the scope of the appended claim.

What I claim as new is:—

A locking means for scraper handles comprising a plate, ears carried by the plate, and roller members journaled upon the ears adapted to hold a handle member therebetween.

In testimony whereof I affix my signature.

ISAAC NIEMI.